United States Patent [19]

Muscillo

[11] 4,162,100
[45] Jul. 24, 1979

[54] COVER ASSEMBLY FOR OPEN BOXES OF VEHICLES

[76] Inventor: Pasquale Muscillo, 1715 Britannia Rd. E., Mississauga, Ontario, Canada, L4W 2A3

[21] Appl. No.: 785,456

[22] Filed: Apr. 7, 1977

[51] Int. Cl.² ............................................ B60P 7/04
[52] U.S. Cl. ............................. 296/100; 296/137 C
[58] Field of Search ............ 296/100, 98, 101, 137 B, 296/137 C, 137 D, 104, 105; 105/377; 160/84 R; 116/173, 28, 45

[56] References Cited

U.S. PATENT DOCUMENTS

| | | | |
|---|---|---|---|
| 2,118,474 | 5/1938 | Morton | 160/84 R |
| 2,610,086 | 9/1952 | Shield | 160/84 R |
| 2,754,900 | 7/1956 | Karobonik et al. | 160/84 R |
| 2,889,171 | 6/1959 | Morris | 105/377 |
| 3,179,464 | 4/1965 | McBurney et al. | 296/100 |
| 3,756,650 | 9/1973 | Michel | 296/137 C |
| 3,806,185 | 4/1974 | Brandjord | 296/98 |
| 3,964,781 | 6/1976 | Fenton | 296/100 |

FOREIGN PATENT DOCUMENTS

| | | | |
|---|---|---|---|
| 995714 | 8/1976 | Canada | 296/105 |
| 1548579 | 12/1968 | France | 296/98 |
| 2259721 | 8/1975 | France | 296/98 |

*Primary Examiner*—James B. Marbert
*Attorney, Agent, or Firm*—Donald E. Hewson

[57] ABSTRACT

A cover assembly for open boxes of vehicles is mounted in the open box by being secured at least at corners of a first end thereof at a first end of the open box. A pair of substantially rigid guides is mounted, one on each side wall of the box near the top edge thereof, and the cover is mounted between the guides with a plurality of hooks or other suitable means secured along each side of the flexible cover material so as to be slidable on the guide means. Fasteners, such as rubber shock cords, are provided to secure the second end of the cover remote from the first end at the second end of the open box remote from the first end when the cover is extended along the length of the box. Indicator means such as flags are provided at the second corners of the cover to indicate whether the cover is extended along the box or not. The guide means are preferably a pair of taut cables. A cover is provided at the first end of the box—usually the front end—and means are provided for securing the flexible cover beneath it when it is to be stowed, such as when the box is empty. When the cover is at the front end of the box, it may be formed with an upwardly directed scoop or air deflector, which tends to cause better air flow characteristics over the box when it is being hauled on a highway at highway speeds.

8 Claims, 7 Drawing Figures

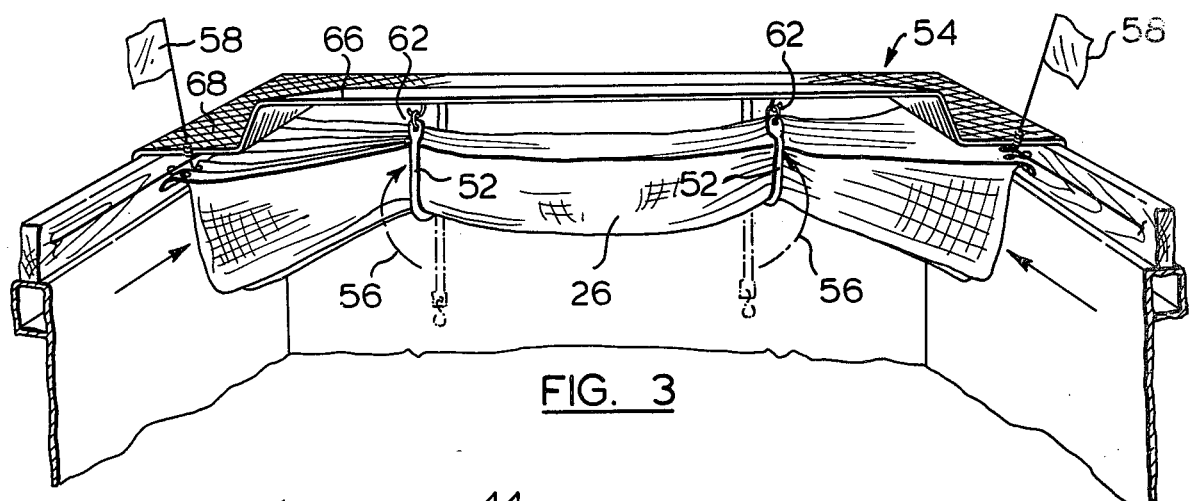
FIG. 3
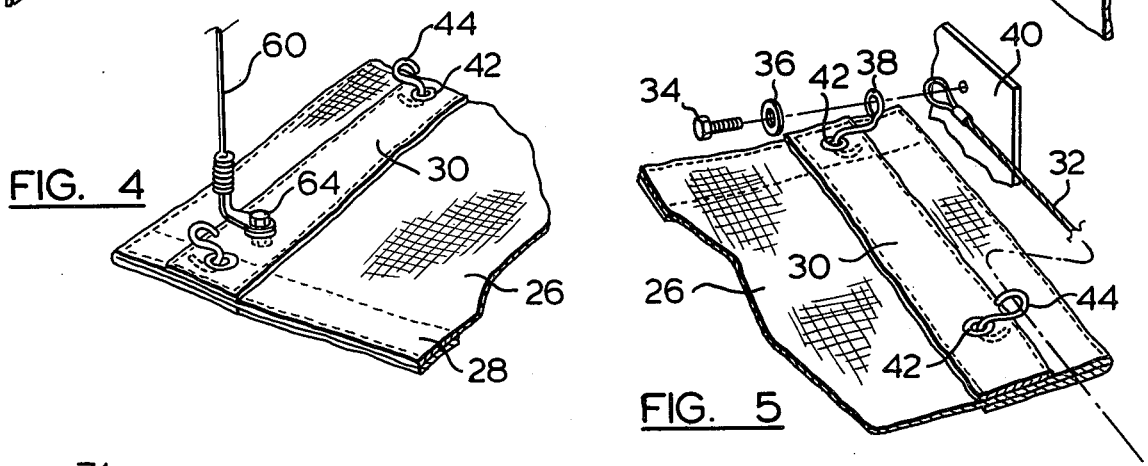
FIG. 4
FIG. 5
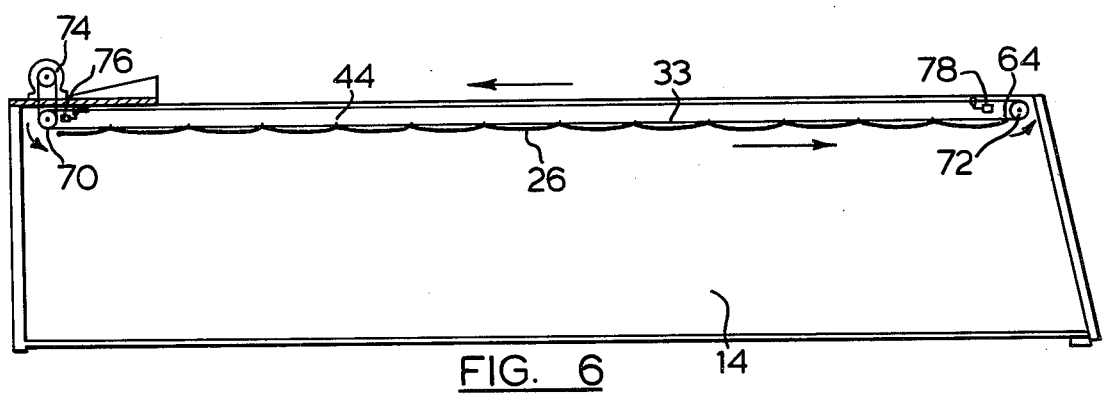
FIG. 6
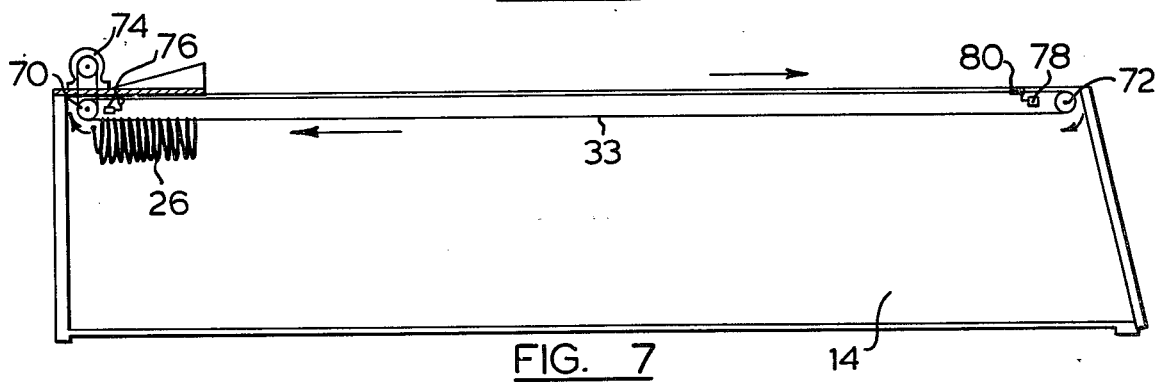
FIG. 7

COVER ASSEMBLY FOR OPEN BOXES OF VEHICLES

FIELD OF THE INVENTION

This invention relates to a cover assembly for open boxes of vehicles and the like, and particularly relates to a cover assembly of the sort adapted for use in the open boxes of trucks which are used on public highways for transporting particulate, granular or lumpy material. Such trucks are often known as dump trucks or haulage vehicles.

BACKGROUND OF THE INVENTION

The necessity and requirement for providing covers for the loads carried in the open boxes of vehicles such as haulage vehicles and dump trucks which use the public highways has been known for some time. This has been especially important when the vehicle is carrying a particulate, granular or lumpy material in its box, such as gravel, crushed stone, slag, salt or any mixture thereof, shredded scrap material of paper or metal, etc.; and is particularly so as to avoid damage to the road surfaces or following vehicles. In general, however, the covers which have been provided for open boxes of such vehicles—especially when the vehicle is of the tractor-trailer variety having a very large and long open box—have been very awkward to deploy and expensive to install.

The most usual cover which has been provided for open boxes of haulage vehicles has been a heavy tarpaulin construction which is simply mounted over the open box by spreading the cover along the box so that its edges overhang the sides thereof, and securing the edges at intervals along the length of the box with ropes or shock cords, usually made of rubber or other elastic material. However, such covers have proven to be unsatisfactory because the edges of the covers tend to flap if the vehicle is moving at high speed, and the deployment of the cover is very awkward if not nearly impossible to be done by one person. Since usually vehicles of the sort contemplated herein carry only one person, the driver, the open boxes of such vehicles have very often remained uncovered.

Other commercial covers for the open boxes of dump trucks and the like have been particularly of the sort taught, for example, in Sibley U.S. Pat. No. 3,549,199 issued Dec. 22, 1970, or White U.S. Pat. No. 3,656,802 issued Apr. 18, 1972. Each of those patents teaches a cover having a bail arrangement which is swingable so that the cross-arm of the bail can be moved from the front to the back of the open box, and carries with it a flexible cover. The cover may be guided on a plurality of cables, such as in the White device, or it may simply be secured to the bail with a crank arrangement to accommodate the re-winding of the cover material on an appropriate spindle or shaft. Such apparatus, however, is particularly useful only on short-bodied open boxes, because otherwise the bail must be very long. In any event, the vehicles of the sort contemplated herein may be very roughly handled and may be required to traverse rough ground, so that the likelihood of damage such as by mis-alignment of the swinging bail arrangement is very high. In such events, the cover is no longer deployable—or worse, has been deployed and must be cut away from the box to permit dumping of the load—and in any event such devices are very expensive.

It has been recognized, however, that a very simple solution to the problems noted above may be provided, and that solution takes into account the fact that, in nearly every instance, the driver of the haulage vehicle will probably climb into the open box of his vehicle to inspect the disposition of the load therein, and to spread the top of the load somewhat more evenly in the box so that it does not extend above the top edge of the box and so as to fill in along the sides where the material of the load has not flowed due to its own angle of repose. Thus, if there is a likelihood that the driver of the vehicle will at least inspect the load in the box of his vehicle, then an arrangement can be made for the driver to deploy a cover over the load in the box at the same time, provided that the cover is mounted in the box in such a manner that the driver alone can accomplish such action. Further, it has been recognized that the various state and provincial authorities who have licensing and regulatory authority over haulage vehicles of the sort contemplated herein are more stringently enforcing their regulations with respect to covers for open boxes of such vehicles and are introducing new regulations, so that liabilities exist if the load is not properly covered. It is therefore important to provide a cover which can be easily deployed, and also to provide indicator means to indicate to the driver and to the authorities whether or not the cover has been properly deployed.

Accordingly, this invention provides a cover assembly for the open boxes of haulage vehicles, dump trucks and the like, where the cover is a flexible material of any suitable construction, and is mounted in the open box by being secured at one end of the box and having its edges movable along guideways mounted on the side walls of the box near the top edges thereof. In such a manner, especially where the driver of the vehicle has entered the box to spread the top of the load, the cover can be deployed by the simple expedient of having the driver grasp the trailing edge of the cover and to walk from the one, stowing, end of the box to the other end of the box so as to deploy the cover over the load therein. When the cover has been deployed, it can be secured by any suitable means such as the attachment of a pair of shock cords of elastic material which hook onto any suitable hook retaining means at that end of the box.

The flexible material of the cover may be a tarpaulin material, or it may be a net or mesh material of suitable construction. Especially where the cover material is a net or mesh material, the mesh size is sufficiently small—as set out by regulation—to preclude passage therethrough of material from the load, but not so as to preclude passage therethrough of air. Thus, there is much less likelihood of the cover tending to billow or balloon as the vehicle is moving at high speed and as air may tend to permeate beneath the cover material.

BRIEF SUMMARY OF THE INVENTION

A principal object of this invention is to provide a cover assembly for open boxes of haulage vehicles and the like, where the cover assembly can be easily deployed and stowed by one person.

Another object of this invention is to provide a cover assembly for open boxes of haulage vehicles and the like which does not rely principally upon the close mechanical alignment and operation of hydraulic or spring-loaded devices.

Yet another object of this invention is to provide a mounting assembly for a cover for open boxes of haulage vehicles which can be converted to an automatic operation very simply and without great expense.

BRIEF DESCRIPTION OF THE DRAWINGS

These and other objects and features of the invention are more fully described hereafter in association with the accompanying figures of drawings, in which:

FIG. 3 is a view looking in the same direction as FIG. 2 of the front end of the box showing the cover in stowed condition;

FIG. 4 is a detail of a rear corner of a cover assembly according to this invention;

FIG. 5 is a detail of a front corner of a cover assembly according to this invention; and FIGS. 6 and 7 are diagrammatic representations of a driven cover assembly in the deployed and stowed conditions, respectively.

DESCRIPTION OF THE PREFERRED EMBODIMENTS

Figure 1:
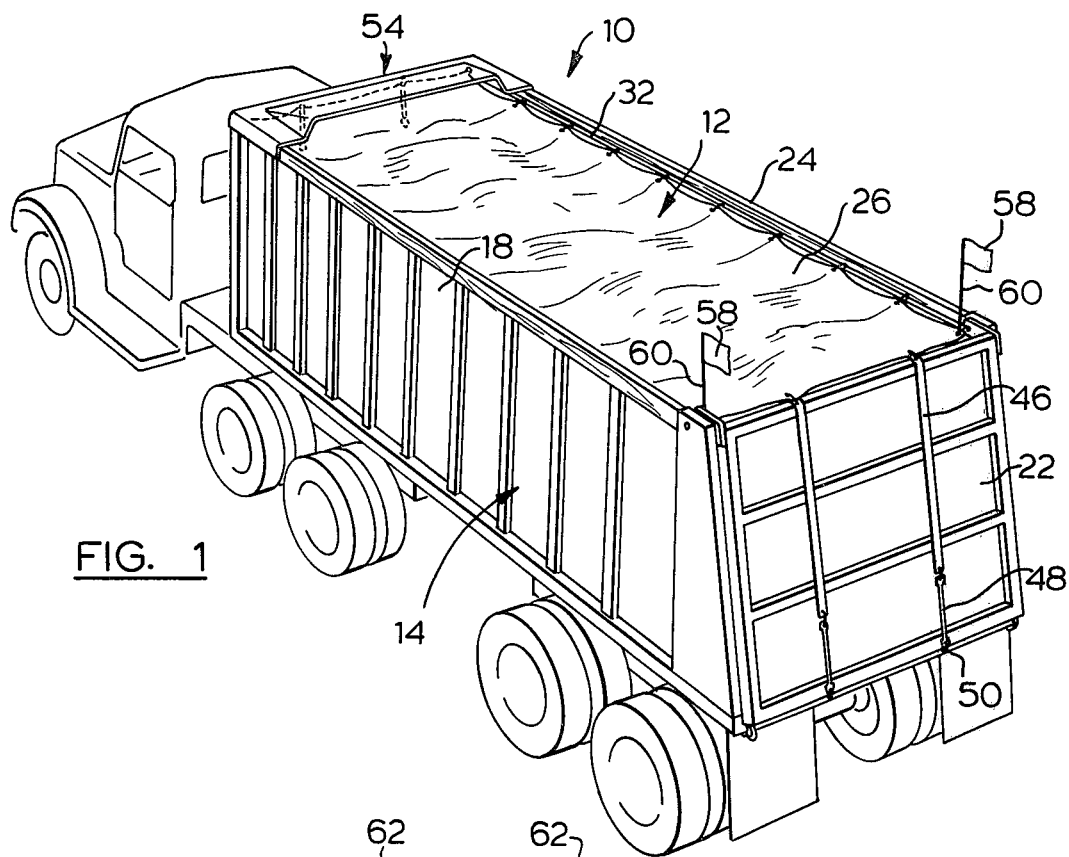
FIG. 1 is a perspective view of a haulage vehicle of the sort contemplated having a cover assembly for its open box in place.

A haulage vehicle or dump truck 10 is indicated in FIG. 1, having a cover assembly 12 in place over an open box 14 thereof. The haulage vehicle 10 is shown to be one of the tractor-trailer variety; but it may as easily be built on a single chassis. In the latter case, however, the open box in which particulate, granular or lumpy material is to be carried is generally considerably shorter than the open box 14 indicated in FIG. 1. The cover assembly 12 is shown to overlie a load which is in the box 14 beneath the cover; and by being thus deployed, the chances of parts of the load being blown or bounced out of the open box 14 are substantially precluded.

As will be noted more particularly hereafter, the cover assembly 12 is one which may be deployed and stowed easily by one person; although an embodiment is contemplated whereby the deployment and storage of the cover may be substantially automatic but with substantially the same mounting assembly. In any event, the cover assembly 12 is mounted over an open box 14 which has a bottom 16, side walls 18 and a front end wall 20 and a rear end wall or tailgate 22. Very often an extension 24 is provided above the height of the steel side walls 18, the extension 24 being formed of wooden planks or the like which may be easily replaced and which may be subject to damage by buckets or grabs as the open box is being loaded.

The cover assembly includes a flexible cover material 26 which has dimensions which are substantially equal to the interior dimensions of width and length of the open box; although the dimensions may be greater in each direction. The flexible material may be a tarpaulin-like material, or it may be a mesh material having a mesh size sufficiently small as to preclude passage therethrough of a substantial portion of the particulate, granular or lumpy material which forms the load in the box. In general, the cover is formed of a net or mesh material so as to permit air to flow past and through the cover from beneath as the vehicle is moving. The material may be edged as at 28 and 30.

Figure 2:
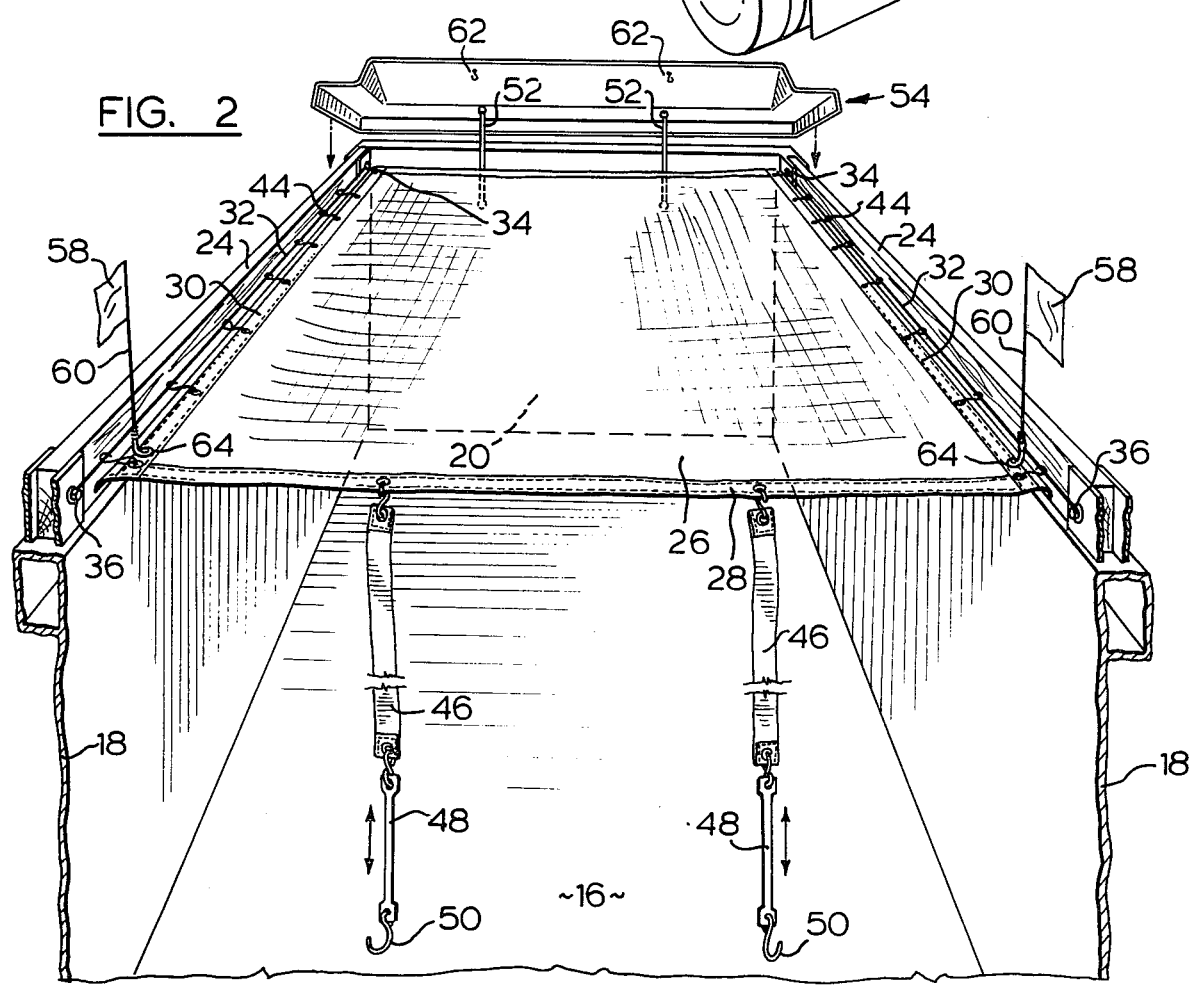
FIG. 2 is a view from the rear of the open box of the vehicle of FIG. 1, in section, showing the mounting assembly of the cover.

There is a pair of substantially rigid guide means mounted in the open box along each of the side walls 18 near the top edge thereof. As illustrated in FIG. 2, the mounting of the guide means usually comprises a pair of taut cables 32 mounted on the upper extensions 24 of the side walls 18; and extending from front fasteners 34 to rear fasteners 36. It will be seen that the guide means are substantially suspended from the front to the rear of the box 14, so as to permit unhindered movement of guidable means such as hooks or the like along the entire length of the box, as discussed hereafter.

So as to provide an effective cover for the load in the open box 14, the width of the flexible material 26, including the edging, should be at least equal to the width between the cables 32; and the length of the material 26 is substantially equal to the length of the box 14.

Referring to FIGS. 3, 4 and 5, it will be noted that the flexible material 26 is mounted in the open box 14 by being secured at least at the front corners thereof. That arrangement can be simply accommodated by such means as passage of the front fasteners 34 through washers 36 and rings 38 into a plate 40, thereby also securing the front end of the cable 32. The front corner of the flexible material 26 may be thereby secured by passing the lower hook end 40 of the ring 38 through grommet 42 formed in the edging of the flexible material.

The flexible material 26 of the cover assembly is suspended between the guide means—in this case, the taut cables 32—by a plurality of guidable means such as hooks 44 in grommets 42 which are spaced along each edge of the flexible material 26. This forms a plurality of guidable means secured by way of the hooks 44 cooperating with the grommets 42 along each edge of the flexible material 26, engaging the guide means—the taut cables—32.

When the cover is deployed, means are provided for securing the end of the flexible material 26 remote from the end at which it is secured to the tailgate or otherwise of the open box. Such means may include straps 46 and shock cords 48 of such material as rubber. They are secured by hooks 50 to the tailgate of the open box 14.

When the flexible material 26 of the cover assembly is in its stowed condition, means such as shock cords 52 are provided at the forward end of the open box 14.

At each rear corner of the cover material 26 there is an indicator such as flag 58 mounted on staff 60. Each of the staffs 60 is mounted by fastener means 64 to the margin or edging of the cover material 26 as shown in FIG. 4. The flags 58 mounted to the staffs 60 provide an indicator to indicate where the free end of the cover material 26 is; that is, to indicate whether or not the cover material is stowed as in FIG. 3 or deployed as in FIGS. 1 and 2.

So as to protect the cover material 26, a rigid cover 54—shown in exploded manner in FIG. 2—is provided. The cover 54 is normally mounted at the front end of the box 14, and may simply comprise a plank fixed across the upper edges of the side walls 18 or extensions 24. A pair of shock cords 52 is mounted beneath the cover, and they pass beneath the cover when in its stowed condition in the manner indicated in FIG. 3 by arrows 56, and are secured to hooks 62 on the underside of the cover 54.

The cover 54 may be formed of a glass fiber reinforced epoxy or other suitable plastics material; and may be formed having a surface 66 in the major portion of its width, which surface 66 is sloped upwardly and rearwardly, as shown. Another portion 68 of the upper surface of the cover 54, across the front and along both sides of the cover, may have a checked or otherwise roughened upper surface to provide more steady footing for the driver of the vehicle 10 to stand or walk upon as required. The upwardly and rearwardly sloped surface 66 acts as a wind deflector, particularly when the vehicle 10 is proceeding on a highway, at highway speeds. Resistance to the wind passing over the box 14 and cover 12 is thereby lessened; and more importantly, the wind is diverted upwardly so as to cause less rippling or other wind effect to the cover material 26.

To deploy the flexible cover material 26 of the cover assembly according to this invention, it is merely necessary in the embodiment which has been discussed thus far for the operator of the haulage vehicle, after he has inspected his load and probably spread the load more evenly into the open box 14, to grasp the free ends of the flexible cover material 26 and to walk backwardly over the load in the open box 14 carrying the cover material 26 with him. Obviously, as seen in FIG. 2, the flexible cover material 26 will move backwardly when so grasped by the co-operative sliding relationship between the hooks 44 and the guide means such as taut cables 32. Obviously, a single person can deploy the flexible cover material 26; even when the open box 14 is only partially full by virtue of the smooth and free riding relationship of the hooks 44 to the taut cables 32.

When the load in the open box 14 is to be dumped, it is merely necessary for the operator to reverse the procedure described above; that is, the operator can grasp the free ends of the flexible cover material 26 and walk forwardly over the load in the open box 14. When the flexible cover material 26 is to be retained in its deployed position, the straps 46 and shock cords 48 are employed together with the hooks 50, as described.

It is possible to provide an automatic means for deploying and stowing the flexible cover material 26, as shown in schematic form in FIGS. 6 and 7. There, the cover material 26 is shown suspended from hooks 44 which co-operate with a cable 33 wrapped around sheaves 70 and 72 at the front and rear ends of the open box 14, respectively. In this instance, however, the rear corners 64 of the flexible cover material 26 are secured to the cable 33, and means such as a motor 74—or alternatively, a crank—are provided to drive the sheave 70. Switches such as microswitches 76 and 78 are provided at the front and rear ends of the open box 14, and a stop 80 may be provided to co-operate with the switches 76 and 78 to stop operation of the motor or motors 74, if they are electrical, when the flexible cover material 26 of the cover assembly is stowed or deployed, respectively.

There has been discussed a cover assembly for open boxes of haulage vehicles and dump trucks, and the like, where the flexible cover material of the cover assembly may be easily deployed and stowed by one person, whether or not the open box is loaded, partially loaded or unloaded. Indicator means such as flags are provided to indicate to the driver and the authorities who may require that any load in the open box be covered, is so covered by the flexible cover material as indicated by the deployed or stowed position of the flags. No means are required for maintaining or holding the edges of the cover material along the sides of the open box in place, because of the holding and co-operative relationship between the hooks securing the cover material to the guide means installed along the sides near the upper edges thereof and the cover material. The only securing means which may be required when the cover material is fully deployed may be one or a pair of straps and shock cords at the rear end of the open box in the embodiment disclosed; and similarly the only means required to maintain the cover in stowed position during such time as the open box is empty and maybe being loaded may be one or a pair of similar shock cords near the front end of the open box in the embodiment disclosed. A rigid cover is provided for the flexible cover in the stowed position so as to preclude damage thereto during such time as the box maybe being loaded by such as front end loaders, overhead buckets, etc.

Other modifications to the details of the assembly shown in the figures and discussed above may be apparent to those skilled in the art, without departing from the spirit and scope of the appended claims.

The embodiments of the invention in which an exclusive property or privilege is claimed are defined as follows:

1. A cover assembly for open boxes of vehicles, where the open box has a bottom, side walls and end walls, and where a load of particulate, granular of lumpy material is to be carried in said open box, comprising:
   (a) a pair of substantially rigid guide means mounted in said box along each of said side walls near the top edge thereof;
   (b) a cover of flexible material having a width at least equal to the width between said guide means and a length substantially equal to the length of said box secured at a first end of said box in the upper portion thereof, said flexible material being secured at least at the corners thereof closest to said first end of said box;
   (c) a plurality of guidable means secured along each edge of said flexible material and engaging said guide means;
   (d) means for securing the end of said flexible material remote from said first end of said box when said flexible material is extended along the length thereof; and
   (e) indicator means secured at the corners of said flexible cover remote from the corners secured at said first end, so as to indicate the position along each side wall of said box where a respective corner and indicator means may be located at any time.

2. The assembly of claim 1 where said guide means comprise a pair of taut cables.

3. The assembly of claim 1 where said flexible material is secured to said guidable means by a plurality of co-operable hooks and grommets.

4. The assembly of claim 1 further including a rigid cover across said first end of said box, and means for securing said flexible cover beneath said rigid cover when stowed thereat.

5. The assembly of claim 2 further comprising drive means to drive said cables, said corners of said flexible cover remote from the corners secured at said first end of said box being secured to said cables.

6. The assembly of claim 1 where said means for securing the end of said flexible material when it is extended along the length of said box comprises shock cords of an elastic material.

7. The assembly of claim 5 further comprising means secured to at least one of said cables and switch means co-operable therewith to stop the driving action of said drive means automatically when said flexible material is fully deployed or fully stowed.

8. The assembly of claim 4 where said rigid cover is at the front end of said box and has at least a portion of its width having an upwardly and rearwardly sloping surface.

* * * * *